United States Patent [19]

Creedon et al.

[11] Patent Number: 5,548,762
[45] Date of Patent: Aug. 20, 1996

[54] IMPLEMENTATION EFFICIENT INTERRUPT SELECT MECHANISM

[75] Inventors: Tadhg Creedon; John Hickey; Eugene G. O'Neil, all of Galway, Ireland

[73] Assignee: Digital Equipment Corporation, Maynard, Mass.

[21] Appl. No.: 227,867

[22] Filed: Apr. 14, 1994

Related U.S. Application Data

[63] Continuation of Ser. No. 828,342, Jan. 30, 1992, abandoned.

[51] Int. Cl.⁶ ............................................. G06F 13/22
[52] U.S. Cl. ..................... 395/733; 395/868; 364/DIG.1; 364/230; 364/230.2; 364/240; 364/241; 364/241.2; 364/241.9; 364/242.2
[58] Field of Search .................................. 395/725, 325, 395/200, 550, 425, 725, 325, 200, 550, 425, 733, 868, 289, 867, 864, 490

[56] References Cited

U.S. PATENT DOCUMENTS

| | | | |
|---|---|---|---|
| 3,627,953 | 12/1969 | Houcke | 379/333 |
| 3,708,785 | 1/1973 | Rawson et al. | 395/200 |
| 3,710,351 | 1/1973 | Nakamura | 395/725 |
| 3,831,151 | 8/1974 | Jones, Jr. et al. | 395/725 |
| 3,921,145 | 11/1975 | Emm et al. | 395/425 |
| 4,023,143 | 5/1977 | Brannstein | 395/725 |
| 4,059,851 | 11/1977 | Nutter, Jr. et al. | 395/275 |
| 4,271,505 | 6/1981 | Menota et al. | 370/85 |
| 4,325,119 | 4/1982 | Grandmaison | 395/375 |
| 4,420,806 | 12/1983 | Johnson, Jr. et al. | 395/725 |
| 4,482,954 | 11/1984 | Vrielink et al. | 395/725 |
| 4,719,569 | 3/1988 | Ludemann et al. | 395/729 |
| 4,734,082 | 3/1988 | Romagosa | 395/725 |
| 4,761,762 | 8/1988 | Holmes | 395/725 |
| 4,791,553 | 12/1988 | Campanini | 395/425 |
| 4,799,148 | 1/1989 | Nishioka | 395/725 |
| 4,807,117 | 2/1989 | Itoku et al. | 395/725 |
| 4,814,974 | 3/1989 | Marayanan et al. | 395/725 |
| 4,841,178 | 6/1989 | Bisson | 307/518 |
| 4,870,566 | 9/1989 | Cooper et al. | 395/325 |
| 4,870,569 | 9/1989 | Nakatani et al. | 395/425 |
| 4,894,565 | 1/1990 | Marquardt | 307/518 |
| 4,897,786 | 1/1990 | Pimm et al. | 395/288 |
| 4,907,149 | 3/1990 | Gula et al. | 395/725 |
| 4,953,081 | 8/1990 | Feal et al. | 395/291 |
| 4,961,067 | 10/1990 | Suzuki | 395/725 |
| 5,014,190 | 5/1991 | Johnson | 395/182.21 |
| 5,038,275 | 8/1991 | Dujari et al. | 395/725 |
| 5,072,363 | 12/1991 | Gallagher | 395/729 |
| 5,081,297 | 1/1992 | Lebel et al. | 395/284 |
| 5,088,024 | 2/1992 | Vernon et al. | 395/725 |
| 5,111,424 | 5/1992 | Donaldson et al. | 395/297 |
| 5,129,090 | 7/1992 | Bland et al. | 395/294 |
| 5,155,854 | 10/1992 | Flynn et al. | 395/725 |
| 5,201,053 | 4/1993 | Benhase et al. | 395/725 |

FOREIGN PATENT DOCUMENTS

| | | |
|---|---|---|
| 303752 | 2/1989 | European Pat. Off. |
| 425849 | 5/1991 | European Pat. Off. |
| 10907 | 9/1990 | WIPO |

OTHER PUBLICATIONS

Hardware Assisted Byte Alignment for High-speed Digital Communications Processors; IBM Technical Disclosure Bulletin, vol. 29, No. 2, July 1986, Armonk, NY, U.S. pp. 864–868.

*Primary Examiner*—Ayaz R. Sheikh
*Attorney, Agent, or Firm*—Christine M. Kuta; Kenneth F. Kozik; Robert F. Perry

[57] ABSTRACT

An implementation efficient interrupt select mechanism which allocates interrupt flags between N interrupt requestors, e.g. communication channels. A multi-channel controller provides the select mechanism with control signals and asserts an interrupt request when a channel, being visited by a scanner, which may be incorporated into the controller, is asserting an interrupt request. If the interrupt flag is available, the number of the channel asserting the request is locked into a latch. The latch remains locked until the interrupt request is cleared, a control signal is received from the controller and the channel being visited by the scanner equals the channel number stored in the latch. The scanner increments from channel to channel regardless of the assertion of the interrupt flag or the locking of the latch. In this manner, a single scanner may be used with any number or interrupt select mechanisms.

2 Claims, 5 Drawing Sheets

IMPLEMENTATION EFFICIENT INTERRUPT SELECT MECHANISM

This application is a continuation of application Ser. No. 07/828,342, filed Jan. 30, 1992, now abandoned.

FIELD OF THE INVENTION

The present invention is directed to interrupt select mechanisms in a computer system and, more particularly, to implementation efficient interrupt select mechanisms which operate to provide for the fair allocation of interrupt flags between N interrupt requesters.

BACKGROUND OF THE INVENTION

In modern computer design, several communication channels provided in a computer system may be controlled by a single multi-channel controller, e.g. a DMA controller. When data are present on a channel, a CPU interrupt request may be generated to interrupt the CPU of the system for processing of the data. Various types of interrupt requests are possible. For example, when data are received by a communication channel one type of interrupt request may be asserted. However, when data are transmitted via a communication channel, a different type of interrupt request may be asserted.

When there are data present on multiple channels at the same time, multiple CPU interrupt requests may exist. These interrupt requests can be for the same or different types of interrupt requests. Typically, each one of several different interrupt flags is available to represent one of the several various types of interrupt requests that may be asserted.

Interrupt flags are used to indicate to the CPU that an interrupt request is being asserted. When there are various interrupt flags asserted, the CPU proceeds to service the various interrupt requests, indicated by the asserted interrupt flags, according to its own priority scheme.

Since there is only one available interrupt flag for any particular type of interrupt request, to indicate to the CPU that a request of the indicated type exists, it may be necessary to share access to the interrupt flag among several channels. Whenever a particular type of interrupt request is being asserted by more than one channel at the same time, a scheme for arbitrating access to the shared resource, e.g. a common interrupt flag, must be implemented.

When a single resource such as an interrupt flag is shared among several communication channels, fairness becomes important. Fairness involves the fair allocation of access to the resource so that no single channel dominates the use of the resource to the extent that other communication channels are unable to receive adequate access.

To insure that adequate access to the common interrupt flag is provided, interrupt select mechanisms are used to implement an arbitration scheme to allocate access to the interrupt flag in a fair manner. In this way, multiple requests for an interrupt among several channels are resolved in a manner that prevents any channel from locking out another channel completely. This insures that the CPU will service the interrupt requests of any particular type in the order they are assigned access to the interrupt flag by the interrupt select mechanism.

In one scheme for an interrupt select mechanism, a round robin scheme for sharing access to an interrupt flag fairly between multiple channels of equal priority is implemented.

In a known method of implementing an interrupt select mechanism using a round robin arbitration scheme, a state machine/counter, which will be referred to as a scanner, is driven by a multi-channel controller, e.g. a DMA controller. The scanner sequences through the channels checking for interrupt requests. The first channel the scanner comes across with an interrupt request pending locks the scanner on the channel and causes an interrupt flag to be set. The scanner remains locked on the channel until the interrupt request is cleared and the interrupt flag is reset. Thus, in the known system, when multiple interrupt flags are available for allocation, a separate scanner is needed for each interrupt type which is represented by an interrupt flag.

In the known system, once the interrupt is cleared, the scanner then proceeds to the next channel and sequences through all the other channels giving them a chance to generate an interrupt request and set the interrupt flag before allowing the initial channel to interrupt again. For each interrupt flag being used, representing a different type of interrupt request, a separate scanner plus interrupt select, set and clear logic in addition to other logic, is required.

Thus, the known system, which requires a scanner, select, set and clear logic for each interrupt flag available for allocation, becomes costly and inefficient to implement when there are multiple interrupt flags in a computer system.

SUMMARY OF THE INVENTION

The present invention provides an apparatus for a fair and implementation efficient interrupt select mechanism for the fair allocation of shared interrupt flags between one of N interrupt requesters.

The interrupt select mechanism of the present invention comprises a state machine/counter referred to as a scanner, and a block of interrupt select, set and clear logic which operates with the scanner. The scanner is capable of servicing N interrupt flags which are available in any given system and may be incorporated as part of the multi-channel controller. While the present invention requires that separate interrupt select, set and clear logic be implemented for each separate interrupt flag that is available, duplication of the scanner is unnecessary.

Since only one scanner is required to service N interrupt flags, significant savings are achieved in both design complexity and cost as compared to the known systems which require that a scanner be implemented for each interrupt flag that is available in the system.

In the apparatus of the present invention, the scanner is at first initialized by the multi-channel controller, and then increments through all the possible channels. The multi-channel controller controls both the incrementing of the scanner and the assertion of a channel interrupt request signal. The channel interrupt request signal indicates that the current channel which the scanner is set at has an interrupt pending and is seeking to set the interrupt flag.

Where multiple interrupt flags are being used in a given system, the multi-channel controller supplies a different channel interrupt request signal to each of the interrupt select mechanisms associated with the various interrupt flags. Which if any of the different channel interrupt signals are asserted will depend on the type of interrupt request being requested by the particular channel being serviced by the scanner at any given time.

When a request for an interrupt is received by the interrupt select control mechanism of the present invention, and the interrupt flag is available to be set, a first signal which represents the interrupt flag is asserted. The assertion of the first signal causes a scan request logic block to de-assert its output, a second signal, which causes the number of the channel requesting the interrupt, represented by a third signal, to be stored in a storage device, e.g. a latch. The stored signal representing the channel number indicates the channel which has been assigned access to the interrupt flag and is to have its interrupt request serviced next by the CPU.

With the de-assertion of its output the scan request logic block and the storage device are locked. The scanner continues to move onto the next channel but the number of the channel requesting the interrupt remains stored in the latch. Since the scanner continues to move onto the next channel and does not become locked, a single scanner may be used in conjunction with any number of interrupt select mechanisms.

Once the interrupt request has been serviced and the interrupt flag represented by the first signal has been cleared by whatever means are appropriate, e.g. by a CPU write, the scan request logic block can be re-enabled by the assertion of a control signal from the multi-channel controller when the scanner channel number equals the stored channel number. Once the scan request logic block is re-enabled it asserts its output signal to re-enable the storage device used to store the signal representing the channel number. With the scan request logic block and the storage device re-enabled the interrupt select mechanism can select another channel to be assigned access to the interrupt flag so that the selected channel can have its interrupt request serviced next.

To insure that a fair "round robin" arbitration scheme is implemented, the scan request logic block of the present invention is re-enabled at a time which is appropriate to ensure that the next channel that can be given access to the interrupt flag is the channel after the most recently serviced channel.

In accordance with a feature of the present invention, the latch is re-enabled late in the timing cycle during which the scanner channel number is equal to the channel number stored in the latch. Thus, the scanner will have moved to the next subsequent channel before the latch can be set again. This insures that the channel which has been assigned access to the interrupt flag is not reassigned access until all the other channels have been given an opportunity to access the interrupt flag and have their interrupt requests serviced.

The present invention is more efficient, in terms of the number of logic gates required to implement a round robin scheme that shares interrupt flags fairly among multiple channels of equal priority, than known systems.

Because the setting of the interrupt flag requires only the storing of the channel number generating the interrupt and some simple comparator logic that ensures a fair round robin scheme, less logic gates are needed to implement the design of the present invention as compared to the known system, which requires the use of an additional latch and a MUX, as will be described below. The reduction in the number of gates required for a specific implementation can be substantial leading to significant cost savings.

The implementation efficiency of the present invention is directly related to both the number of channels that are responsible for the generation of interrupt requests and the number of interrupt flags to be shared between the channels. The improvement in the implementation efficiency of the present invention over known devices is greatest in applications that have many channels and several interrupt types to be shared between the channels.

In an application having two interrupt flags that are shared between up to 32 channels, the known round robin implementation would require, e.g., approximately 650 gates, using TSB140G technology, to implement each scanner with two scanners being required, one for each interrupt flag that is available. Thus, the known implementation would require a total of 1300 gates to implement using TSB140G technology.

However, the apparatus of the present invention requires only 262 gates to implement using TSB140G technology, a round robin scheme for two interrupt flags being shared between up to 32 channels, where the number of channels is programmable. A savings resulting from using over 1000 fewer gates to implement the design gives the apparatus of the present invention a significant cost advantage over the known implementation.

Furthermore, in accordance with another feature of the present invention, the selection of the interrupt request, which is to be given access to the interrupt flag, is synchronized to the scanner's visit to the channel which is to have its interrupt request serviced. This can reduce the total gate count required for implementation of the apparatus since it is possible to use registers based in static random access memory ("SRAM") or dynamic random access memory ("DRAM"), the contents of which can then be loaded into the multi-channel controller's registers, at the start of a channel's timing cycle.

DETAILED DESCRIPTION

Figure 1:
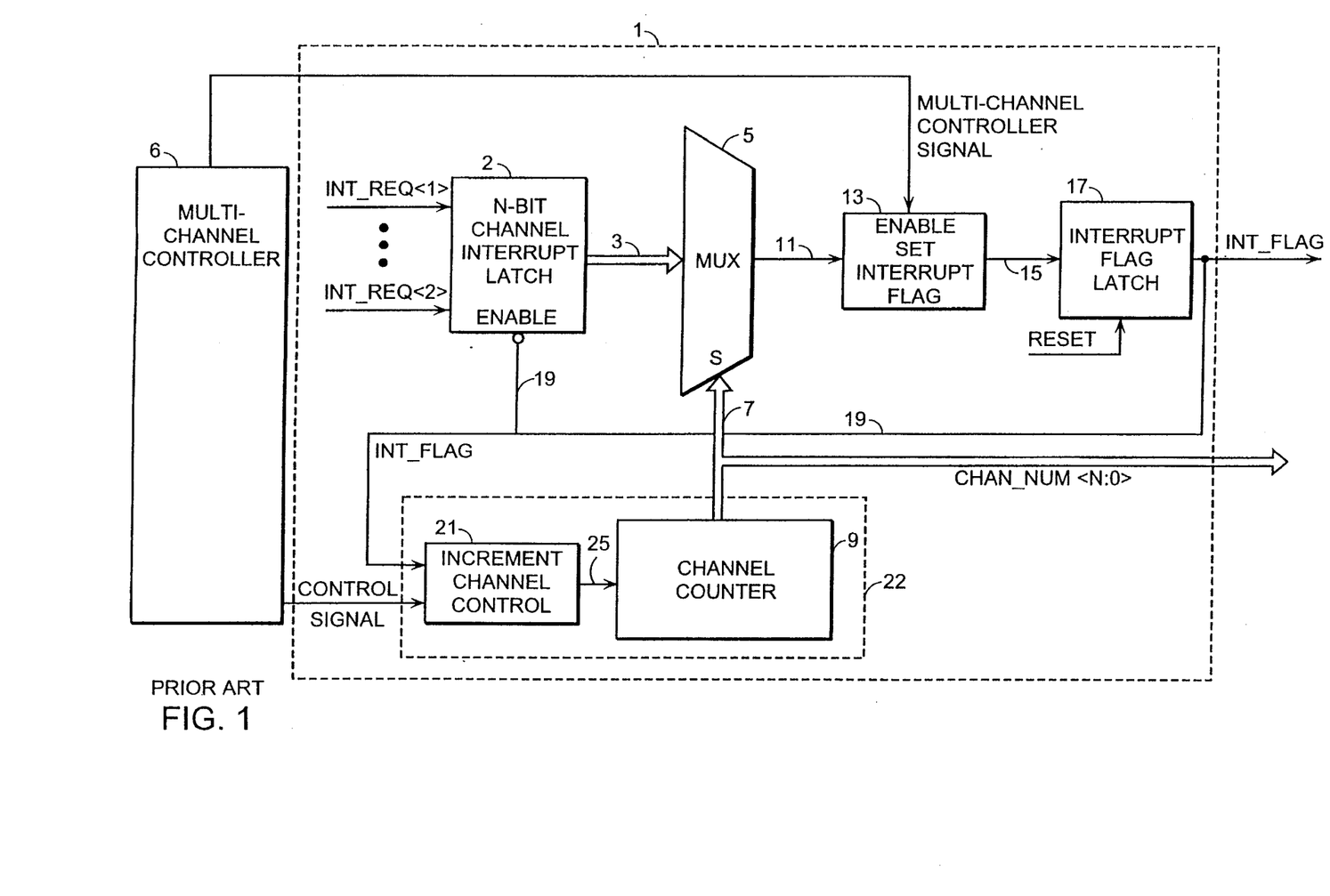
FIG. 1 is a block diagram of a prior art circuit for implementing an interrupt select mechanism.

Referring now to the drawings, FIG. 1 illustrates a block diagram of a known circuit for an interrupt select mechanism indicated by the number 1. In the known circuit, an N number of interrupt requests, INT_REQ<1> through INT_REQ<N>, are supplied to inputs (1) through (N) of an N-bit channel interrupt latch 2.

The channel interrupt latch 2 has a negated enable input and an N bit interrupt request output. The negated enable input of the latch 2 is coupled by a line 19 to an INT_FLAG output of the interrupt select mechanism 1. The INT_FLAG output of the interrupt select mechanism 1, supplies the signal which indicates to the CPU when an interrupt flag is set.

The N bit interrupt request output of the channel interrupt latch 2 is coupled by a bus 3 to the input of a MUX 5. The output of the MUX 5 is controlled by a select control input which is coupled by a bus 7 to the output of a channel counter 9. The bus 7, which is coupled to both the MUX 5 and to a channel number output of the interrupt select mechanism 1, supplies a signal CHAN_NUM<N:0> which indicates the number of the current channel being visited by the counter 9.

The output of the MUX 5 is coupled by a line 11 to the input of a set interrupt flag logic block 13. The set interrupt flag logic block 13 has an enable input which receives a control signal from a multi-channel controller 6. The output of the set interrupt flag logic block 13 is coupled by a line 15 to an interrupt flag latch 17.

The interrupt flag latch 17 also has a RESET input. A RESET signal is applied to the RESET input to reset the interrupt flag latch 17 when appropriate. The interrupt flag output of the latch 17 is coupled by the line 19 to the INT_FLAG output of the interrupt select mechanism 1, to the negated enable input of the channel interrupt latch 2 and to the INT_FLAG input of an increment channel control logic block 21.

The increment channel control logic block 21 has another input supplied with the control signal from the multi-channel controller 6. The output of the increment channel control logic block 21 is coupled to the input of the channel counter 9 by a line 25. Together, the increment channel control logic block 21 and the channel counter 9 comprise what is referred to as a scanner 22.

In the known interrupt select mechanism 1, illustrated in FIG. 1, a round robin arbitration scheme is implemented. Interrupt requests INT_REQ<1> through INT_REQ<N> are input into the N-bit channel interrupt latch 2. The channel interrupt latch 2 is enabled and latches in the interrupt requests whenever the signal INT_FLAG is not asserted indicating that the interrupt flag is available to be assigned to a channel requesting an interrupt request.

The output of the channel interrupt latch 2 is supplied by the bus 3 to the input of the N input MUX 5. The MUX 5 is used to select which interrupt request signal from the various channels 1 through N will be used to supply the input signal to the set interrupt flag logic block 13.

The scanner 22 supplies the signal CHAN_NUM<N:0> to the select control input of the MUX 5 and the CHAN_NUM<N:0> output of the interrupt select mechanism 1. Thus, the channel which the scanner 22 is set to at any given time is permitted access to the interrupt flag represented by the signal INT_FLAG. Furthermore, in this manner, the channel number of the channel which has been allocated access to the interrupt flag is made available to the CPU (not illustrated) which can service any interrupt request that may be asserted.

The output of the MUX 5 is supplied to the set flag logic block 13. The set flag logic block 13 is also supplied with the control signal from the multi-channel controller 6 which is used to synchronize the timing of the assertion of the INT_FLAG signal. Only when both input signals, from the MUX 5 and the multi-channel controller 6 are asserted, will the input to the interrupt flag latch 17 be asserted. The interrupt flag latch 17 responds to an asserted input signal, by asserting the INT_FLAG signal until it is reset.

The scanner 22 receives as inputs, the control signal from the multi-channel controller 6 and the signal INT_FLAG output by the interrupt flag latch 17. Both input signals are applied to the inputs of the increment channel control 21. The control signal and the INT_FLAG signal are used to control the incrementing of the channel counter 9. The output of the increment channel control 21 will be asserted only when the INT_FLAG signal is de-asserted and the control signal from the multi-channel controller 6 is asserted.

When the signal INT_FLAG is asserted, it indicates that a CPU request from a channel which was assigned access to the interrupt flag currently exists. The assertion of the INT_FLAG signal causes the increment channel control 21 to de-assert the input signal to the channel counter 9, stopping the incrementing of the counter 9. The channel counter 9 will remain locked on the particular channel until the interrupt request indicated by the signal INT_FLAG has been serviced and the INT_FLAG signal is de-asserted by resetting the latch 17. Thus, a separate scanner 22, which includes the channel counter 9, must be implemented for each different interrupt type.

When the interrupt flag signal, INT_FLAG, is not asserted, assertion of the control signal from the multi-channel controller 6 will cause the increment channel control 21 to assert and the channel counter 9 will be incremented.

In this manner, the scanner 22 sequences through the channels 1 through N as the interrupt select mechanism 1 checks for interrupt requests.

The first channel the interrupt select mechanism 1 comes across with an interrupt pending locks the scanner 22 on the channel and causes the interrupt flag represented by the signal INT_FLAG to be set. The scanner 22 remains locked until the interrupt request is cleared and the interrupt flag is reset by the assertion of a RESET signal which is supplied to the reset input of the interrupt flag latch 17.

The resetting of the interrupt flag, indicated by the de-assertion of the signal INT_FLAG, re-enables the channel interrupt latch 2 and the scanner 22 which had been locked upon assertion of the signal INT_FLAG.

In the known system illustrated in FIG. 1, once the interrupt is cleared, the scanner 22 then proceeds to the next channel and sequences through all the other channels giving them a chance to generate an interrupt request and set the interrupt flag before allowing the initial channel to interrupt again. In this manner, a round robin arbitration scheme is achieved.

In the known system, when multiple interrupt flags are being used, with each flag representing a different type of interrupt request, a separate scanner 22 plus the latch 2, MUX 5, set logic block 13 and interrupt flag latch 17, must all be implemented for each interrupt flag that is available.

Figure 2:
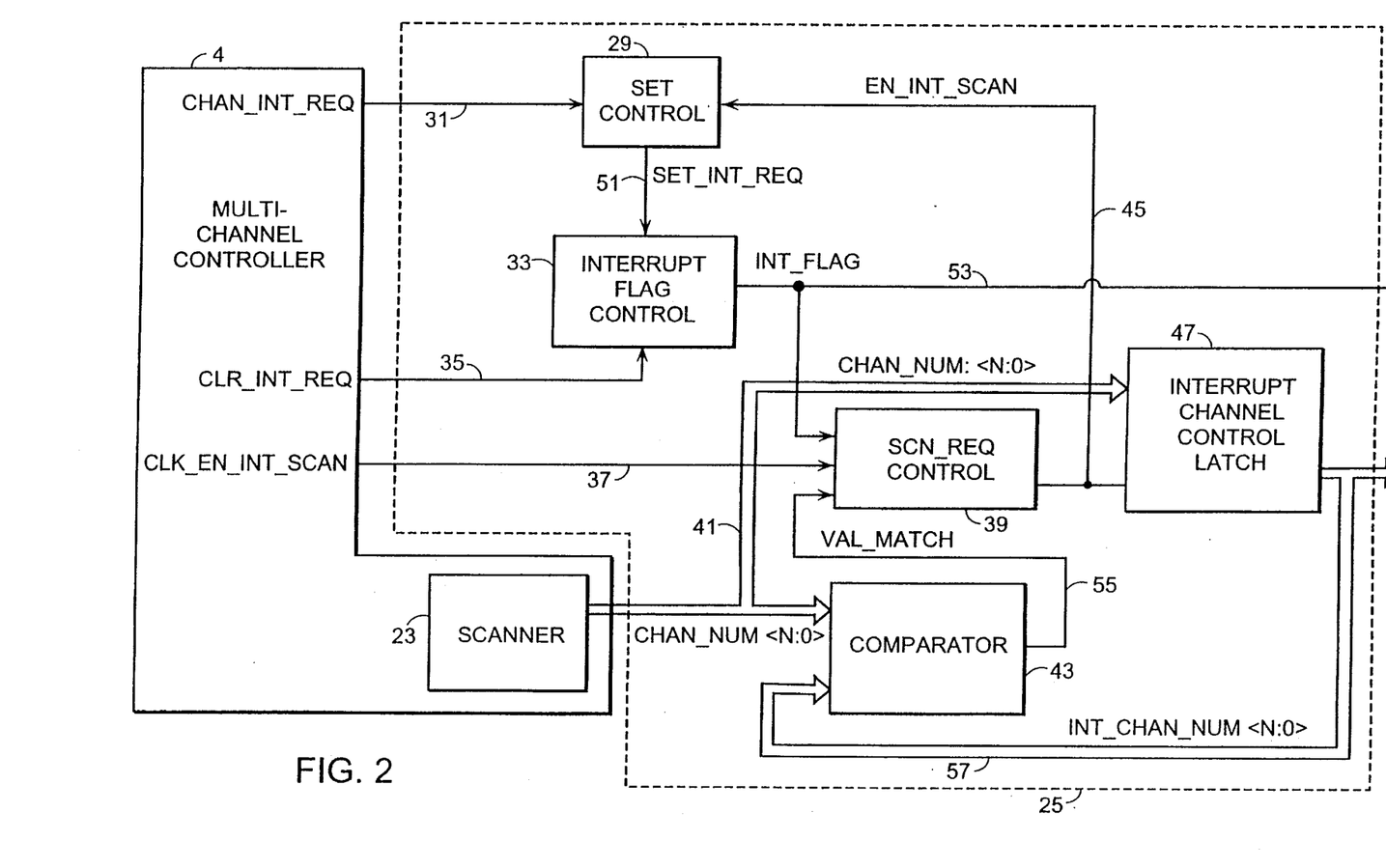
FIG. 2 is a block diagram of an exemplary embodiment of a circuit for an interrupt select mechanism according to the present invention.

Referring now to FIG. 2, there is illustrated an exemplary embodiment of the present invention. A multi-channel controller 4, controls the overall timing of an interrupt select mechanism 25. The multi-channel controller 4 controls the timing of the interrupt select mechanism 25 by supplying control signals CHAN_INT_REQ, CLR_INT_REQ, CLK_EN_INT_SCAN, and a signal CHAN_NUM<N:0> to the interrupt select mechanism 25 at the appropriate times, as will appear. The signal CHAN_NUM <N:0> is generated by a scanner 23 which has been incorporated into the multi-channel controller 4. A single scanner 23 can be used for several interrupt select mechanisms 25.

A line 31 couples the CHAN_INT_REQ signal output by the multi-channel controller 4 to a first input of a set control logic block 29. The signal CHAN_INT_REQ is used by the multi-channel controller 4 to indicate when an interrupt request is being asserted by the channel being visited by the scanner 23.

A SCN_REQ control logic block 39 has an EN_INT_SCAN (enable interrupt scan) output coupled by a line 45 to a second input to the set control logic block 29 and an enable input of an interrupt channel control latch 47.

In the embodiment of the present invention illustrated in FIG. 2, the signal EN_INT_SCAN is asserted on power up. However, it is possible to use the controller 4 to initialize the signal EN_INT_SCAN upon power up to whatever setting is desired.

The set control logic block 29 has its output coupled by a line 51 to an input of an interrupt flag control logic block 33. The signal SET_INT_REQ output by the set control logic block 29 is asserted to indicate that the current channel being serviced has been assigned access to the interrupt flag, and that the INT_FLAG signal should be set.

The multi-channel controller 4 has its clear interrupt request signal ("CLR_INT_REQ") output coupled by a line 35, to a second input of the interrupt flag control logic block 33. The signal CLR_INT_REQ is asserted to indicate that the interrupt flag, represented by the signal INT_FLAG, is to be cleared.

The INT_FLAG signal output by the interrupt flag control logic block 33 is coupled by a line 53 to the first input of the SCN_REQ control logic block 39 and the INT_FLAG output of the interrupt select mechanism 25.

A CLK_EN_INT_SCAN output of the controller 4 is coupled by a line 37 to a second input of a SCAN_REQ control logic block 39. The signal CLK_EN_INT_SCAN is used to control the time period in which the interrupt select mechanism 25 is enabled or disabled, (i.e. locked).

A third input of the SCN_REQ logic block 39 is coupled by a line 55 to the output of a comparator 43 which supplies the signal VAL_MATCH as an input to the SCN_REQ control logic block 39. The VAL_MATCH signal is asserted by the comparator 43 to indicate that the current channel number set in the controller based scanner 23 is the same as the current interrupt channel number held in the interrupt channel latch 47. The comparator 43 compares its first and second inputs and asserts its output signal VAL_MATCH only if the two inputs are equal. The first input to the comparator 43 is a signal CHAN_NUM<N:0> output by the controller 4 and generated by the controller based scanner 23. The output of the scanner 23 is coupled by a bus 41 to the first input of the comparator 43 and to an input of the interrupt channel latch 47.

An INT_CHAN_NUM<N:0> signal output of the interrupt channel latch 47 is coupled by a bus 57 to the INT_CHAN_NUM<N:0> output of the interrupt select mechanism 25 and to the second input of the comparator 43. The signal INT_CHAN_NUM<N:0> represents the number of the channel which has been given access to the interrupt flag and which is responsible for the assertion of the signal INT_FLAG.

The overall timing of the interrupt select mechanism 25 is defined by the multi-channel controller 4. The controller 4 controls when a channel interrupt request is asserted, when an interrupt is cleared and when the scanner 23 increments onto the next channel.

In order to control the timing of the interrupt select mechanism 25, the multi-channel controller 4 has a scanner 23 which increments through all the required channels, e.g. channels 1 through N. The scanner 23 is initialized by the controller 4 and is incremented onto the next channel after the assertion of a CLK_EN_INT_SCAN control signal output by the multi-channel controller 4.

The controller 4 also supplies the signal CHAN_INT_REQ to indicate when the channel currently being serviced, as represented by the signal CHAN_NUM<N:0>, is asserting an interrupt request.

The controller 4 is responsible for the clearing of the interrupt flag, represented by the signal INT_FLAG which represents an interrupt request. In order to clear the interrupt request when necessary, e.g. when the CPU indicates that the request has been serviced, the controller 4 asserts the signal CLR_INT_REQ which is supplied to the interrupt flag control block 33.

The remaining timing function that the controller 4 provides is the timing and control of the CLK_EN_INT_SCAN signal which is used, in conjunction with other signals as will be described below, to control the timing of the enabling/disabling of the SCN_REQ logic block 39.

Once the controller 4 has been initialized it continuously scans through the required number of channels. Initially, the interrupt flag, the signal INT_FLAG is not asserted, i.e. is free, the signal INT_CHAN_NUM<N:0> tracks the controller based channel number CHAN_NUM<N:0>.

When the scanner 23 is set to a channel which is requesting access to the interrupt flag, the controller 4 indicates that channel, represented by the signal CHAN_NUM<N:0>, has an interrupt pending by asserting the signal CHAN_INT_REQ.

The signal CHAN_INT_REQ is logically ANDed with the signal EN_INT_SCAN to determine whether the interrupt flag should be set. This logical operation occurs in the SET control logic block 29 which asserts its output signal SET_INT_REQ as follows:

$$\text{SET\_INT\_REQ} = \text{CHAN\_INT\_REQ} * \text{EN\_INT\_SCAN} \qquad (1)$$

where:

"*" represents the logical operation AND.

Accordingly, the signal SET_INT_REQ is asserted when the controller 4 indicates that the current channel has an interrupt pending and when the interrupt scanning is enabled.

When the signal SET_INT_REQ is asserted, this causes the interrupt flag control block 33 to assert the signal INT_FLAG indicating that an interrupt request is being asserted. The interrupt flag control block 33 is used to set and clear the signal INT_FLAG as required.

The assertion of the signal INT_FLAG causes the SCN_REQ logic block 39 to stop the searching for pending interrupts, i.e., become locked. This locking of the interrupt select mechanism 25 is achieved by the logic block SCN_REQ 39 de-asserting the signal EN_INT_SCAN. The signal VAL_MATCH, which is used by the logic block SCN_REQ 39 in generating the signal EN_INT_SCAN, is asserted by the comparator 43 when the signals INT_CHAN_NUM<N:0> and CHAN_NUM<N:0> are equal. The interrupt channel control latch 47 may comprise, e.g. a block of N latches, one for each bit of the signal CHAN_NUM<N:0>. By de-asserting the signal EN_INT_SCAN, the interrupt control latch 47 is closed, holding the value of the signal CHAN_NUM <N:0>. The logic block 39 asserts the signal EN_INT_SCAN as follows:

$$\text{D\_EN\_INT\_SCAN} = \overline{\text{INT\_FLAG}} * (\text{EN\_INT\_SCAN} + \text{VAL\_MATCH}) \qquad (2)$$

and $$\text{EN\_INT\_SCAN} = \text{D\_EN\_INT\_SCAN} \qquad (3)$$

when the signal CLK_EN_INT_SCAN is asserted. Where D_EN_INT_SCAN is an enable pre-set signal, as will be described below, and where:

"*" represents the logical operation AND

"+" represents the logical operation OR.

Thus, when the signal INT_FLAG is asserted, the signal D_EN_INT_SCAN will be de-asserted according to equation (2).

By using the current value of the signal EN_INT_SCAN to generate the signal D_EN_INT_SCAN and thus the next value of the signal EN_INT_SCAN in accordance with equations (2) and (3), the latency time between the setting of the present interrupt flag and the setting of the next interrupt flag is reduced when the flag is set and cleared early in the period during which the scanner 23 is set to the channel responsible for the setting of the interrupt flag. When the interrupt flag is cleared before the scanner 23 has incremented to the next channel, the next channel will be given access to the interrupt flag if it asserts an interrupt request. In the above case, the latency period between grants of access to the interrupt flag is reduced since the scanner 23 need not cycle all the way around to the channel which was initially responsible for the setting of the interrupt flag before the next channel is permitted access to the flag.

The signal CLK_EN_INT_SCAN used to control when the signal EN_INT_SCAN will be set to equal the signal D_EN_INT_SCAN in accordance with equation (3) above, is asserted by the multi-channel controller 4, late in every timing cycle, where a timing cycle refers to the time period during which the scanner 23 remains set to any particular channel. Thus, the signal CLK_EN_INT_SCAN is asserted only after the time for the assertion of the CHAN_INT_REQ signal has passed. With the assertion of the signal CLK_EN_SCAN during every timing cycle, the value of the signal EN_INT_SCAN is set equal to the value of the signal D_EN_INT_SCAN in accordance with equation (3).

The assertion of the signal CLK_EN_INT_SCAN, only after the time for the assertion of the signal CHAN_INT_REQ has passed, permits the assertion of the EN_INT_SCAN signal in accordance with equations (2) & (3) above, and thus the re-enabling of the latch 47 without the possibility of the channel which was just given access to the interrupt flag from being immediately given access to the interrupt flag again. In this manner, the scanning for the next channel to be given access to the interrupt flag starts with the channel subsequent to the one that was just given access to the interrupt flag.

Figure 3:
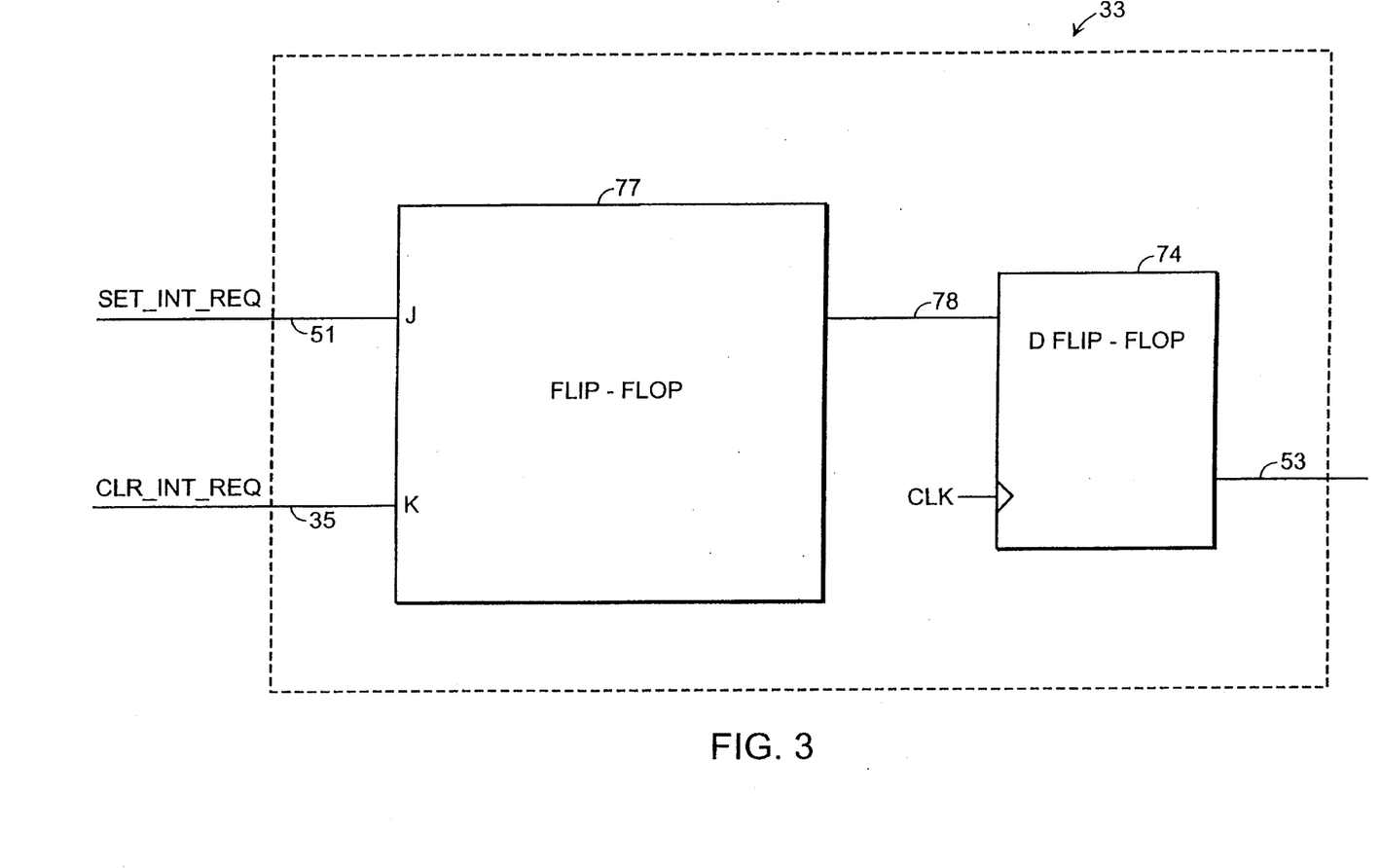
FIG. 3 is a block diagram of an exemplary embodiment of a circuit which may be used as the interrupt flag control logic block of the apparatus illustrated in FIG. 2.

Referring now to FIG. 3, there is illustrated an exemplary embodiment of a logic circuit which may be used as the interrupt flag control block 33 of FIG. 2. As illustrated in FIG. 3, a JK flip-flop 77 having its output coupled by a line 78 to the input of a D type flip-flop 79 may be used as the set control logic block 33. In such an embodiment, the J input of the JK flip-flop 77 is coupled to the line 51 and is supplied with the signal SET_INT_REQ. The K input of the JK flip-flop 77 is coupled to the line 35 and supplied with the signal CLR_INT_REQ. The output of the JK flip-flop 77 is coupled to the input of a D type flip-flop 79 by a line 78. The D type flip-flop 79 which has its clock input coupled to a system clock (not illustrated) serves to synchronize the output of the interrupt flag control block 33 to the timing of the controller 4.

Figure 4:
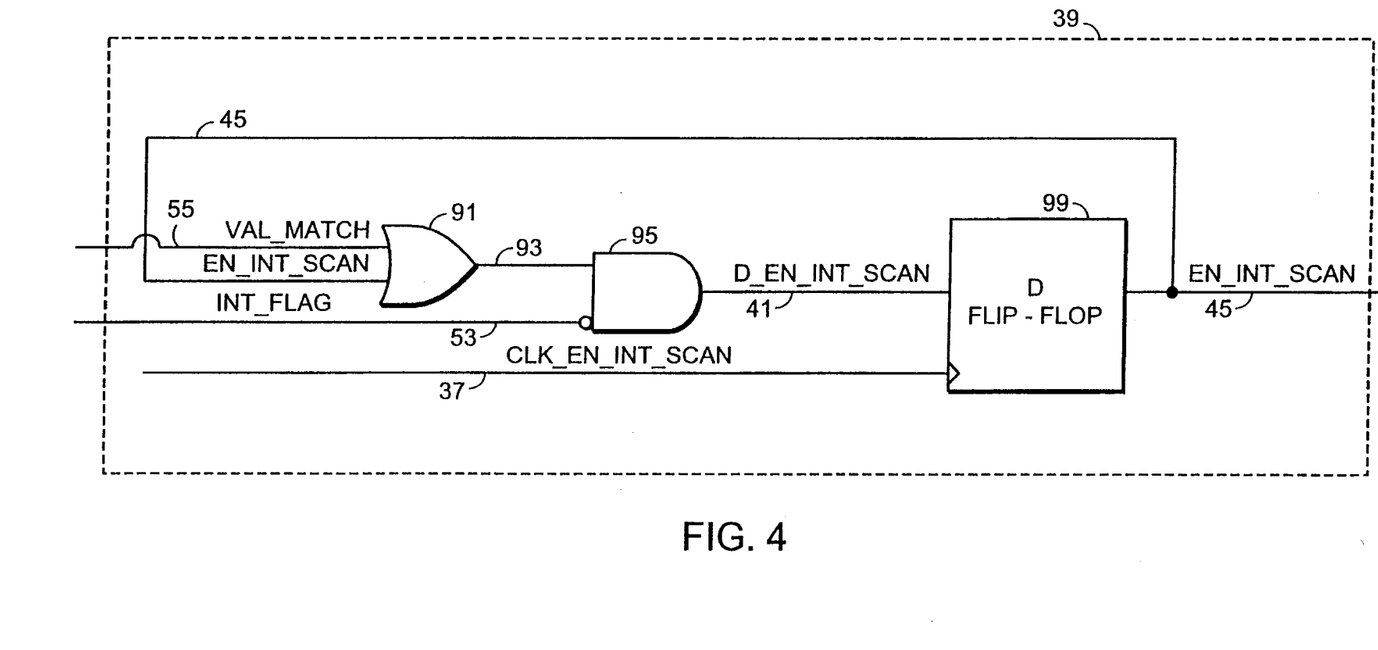
FIG. 4 is a block diagram of an exemplary embodiment of a circuit which may be used as the SCN_REQ logic block of the apparatus of FIG. 2.

Referring now to FIG. 4, there is illustrated a block diagram of an exemplary embodiment of a circuit which may be used as the SCN_REQ logic block 39 of FIG. 2. An OR gate 91 which has a first input coupled to the line 55, receives the signal VAL_MATCH as an input. The second input to the OR gate 91 is coupled to the line 45 and is supplied with the signal EN_INT_SCAN.

The output of the OR gate 91 is coupled by a line 93 to a first input of an AND gate 95. A second input of the AND gate 95 is a negated input which is coupled to the line 53 which supplies the input signal INT_FLAG. The output of the AND gate 95 is the signal D_EN_INT_SCAN referred to in equations (2) and (3).

The output of the AND gate 95 is coupled by a line 97 to the input of a D flip-flop 99. The flip-flop 99 has its clock input coupled to the line 37 which supplies the signal CLK_EN_INT_SCAN which is used to enable or disable the flip-flop 99. The D flip-flop 99 generates the signal EN_INT_SCAN output by the SCN_REQ logic block 39. As noted above, the signal EN_INT_SCAN is used to control the enabling/disabling of the latch 47 to lock a channel number into the latch 47 when the particular channel has been assigned access to the interrupt flag.

Figure 5:
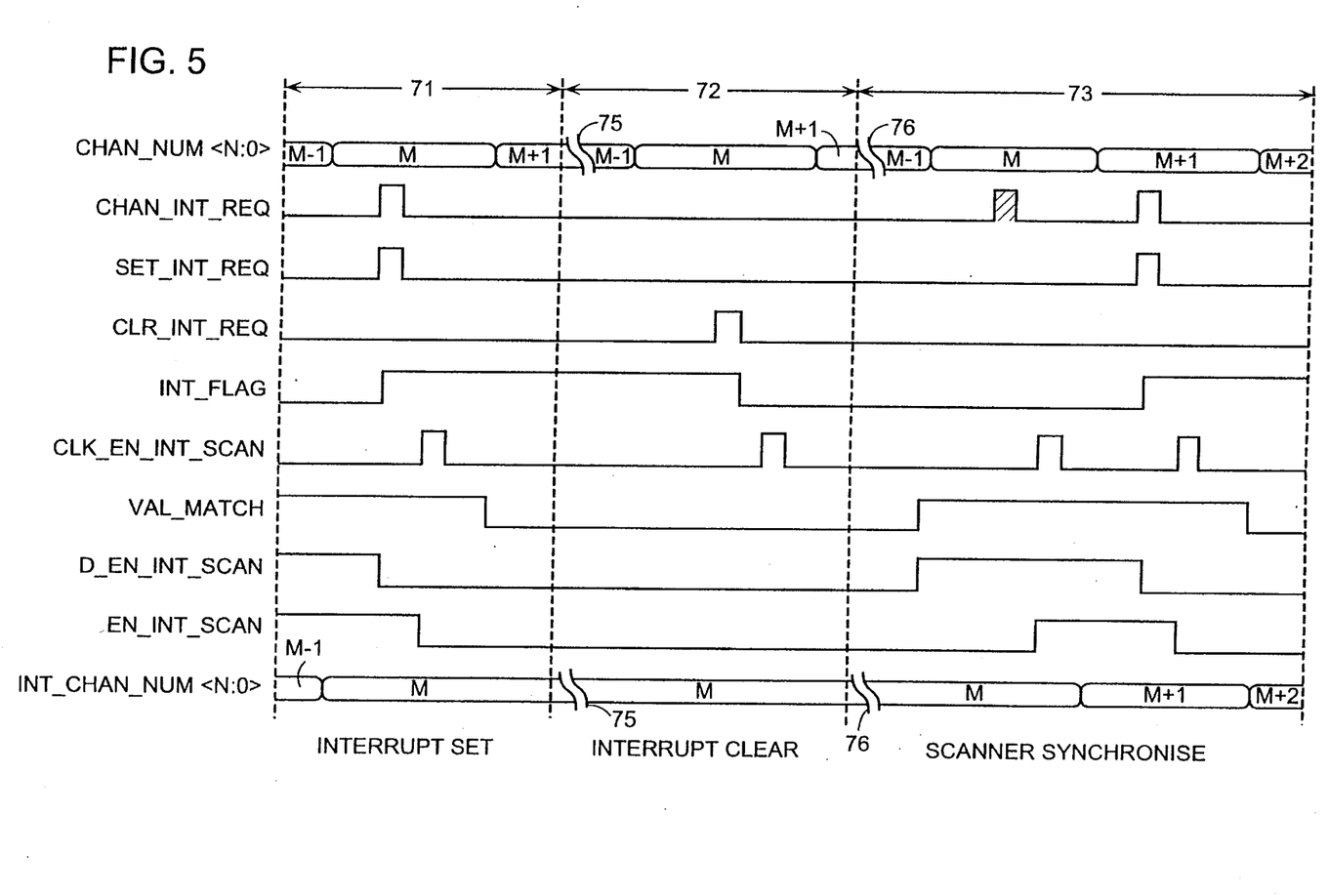
FIG. 5 is a timing diagram for the circuit of FIG. 2.

The operation of the apparatus of the present invention, illustrated in FIG. 2, will now be explained by referring to the timing diagram of the apparatus as illustrated in FIG. 5. The timing diagram is divided into three sections, 71–73, to facilitate the description of the operation of the apparatus of FIG. 2. In FIG. 5, the jagged lines 75 and 76 represent breaks between time-slots. The scanner 23 continues to increment through the channels during these breaks in the timing diagram.

Initially, the interrupt flag, the signal INT_FLAG is not asserted, i.e. is free, and the signal INT_CHAN_NUM<N:0> tracks the controller based channel number CHAN_NUM<N:0>. This is the situation shown in section 71 of FIG. 5, as CHAN_NUM<N:0> moves from channel M−1 to channel M. At this point in time, the signal INT_FLAG is not asserted and the signal EN_INT_SCAN is set allowing the signal CHAN_NUM<N:0> to be latched into the interrupt channel control latch 47. Thus, the signal CHAN_NUM<N:0> and INT_CHAN_NUM<N:0> are equal at this time.

The controller 4 proceeds to indicate that channel M has an interrupt pending by asserting the signal CHAN_INT_REQ while the signal CHAN_NUM <N:0> is set to channel M. This causes the signal INT_FLAG to be set and the signal D_EN_INT_SCAN to de-assert in accordance with equation (2) above.

The signal CLK_EN_INT_SCAN is then asserted, at a time which is now late in the timing cycle while the scanner 23 is still set to channel M, and at a point in time after the assertion of the CHAN_INT_REQ signal has passed. Thus, in section 71 of FIG. 5, it can be seen that the CLK_EN_INT_SCN signal is asserted after the assertion of the CHAN_INT_REQ signal.

In accordance with equation (3) above, assertion of the signal CLK_EN_INT_SCAN by the controller 4 causes the signal EN_INT_SCAN to be set equal to the signal D_EN_INT_SCAN, which was previously de-asserted upon the assertion of the signal INT_FLAG. Thus, with the assertion of the CLK_EN_INT_SCAN signal, in section 71 of FIG. 5, the signal EN_INT_SCAN is de-asserted causing the latch 47 to close storing the value M which represents the channel whose interrupt request is responsible for the setting of the interrupt flag, INT_FLAG.

As the controller based scanner 23 moves onto the next channel, M+1, the signal INT_FLAG remains asserted, and the signal INT_CHAN_NUM<N:0> remains locked on M. The signal VAL_MATCH, which is asserted by the comparator 43 only when the signals INT_CHAN_NUM<N:0> and CHAN_NUM<N:0> are equal, is de-asserted as the scanner 23 moves onto channel M+1.

Referring now to section 72 of FIG. 5, the interrupt request represented by the assertion of the signal INT_FLAG, is cleared as a result of the assertion of the signal, CLR_INT_REQ, by the multi-channel controller 4. As noted, asserting the signal CLR_INT_REQ causes the interrupt flag control logic block 33 to de-assert the signal INT_FLAG.

However, as shown in section 72 of FIG. 5, the de-asserting of the signal INT_FLAG does not result in the immediate re-assertion of the signal EN_INT_SCAN which continues to remain de-asserted. Thus, the interrupt channel control latch 47 which is controlled by the signal EN_INT_SCAN remains locked.

Thus, in the example shown in section 72 of FIG. 5, even if the controller asserts the signal CHAN_INT_REQ, the interrupt flag represented by the signal INT_FLAG, will not be set since the signal EN_INT_SCAN has not yet been re-asserted via line 45 which is coupled to the set control logic block 29.

The interrupt channel control latch 47 remains locked on channel M, until the interrupt select mechanism's output signal INT_CHAN_NUM<N:0>, representing channel M, matches the controller based scanner output signal CHAN_NUM<N:0>. While the latch 47 is locked, the scanner 23 continues to sequence through the other channels, i.e. CHAN_NUM<N:0> moves through channel R+1, channel R+2, etc. as shown in section 72 of FIG. 5 thus permitting the scanner 23 to be used to service other interrupt select mechanisms.

When the signal CHAN_NUM<N:0> generated by the scanner 23, and the signal INT_CHAN_NUM<N:0> are equal, the comparator 43 asserts the signal VAL_MATCH. Thus, when CHAN_NUM<N:0> is incremented to channel M, by the scanner 23, which is equal to the value of INT_CHAN_NUM<N:0> stored in the latch 47, the signal VAL_MATCH is asserted by the comparator 43. This assertion of the signal VAL_MATCH is shown in section 73 of FIG. 5.

As noted above, the signal INT_FLAG was previously de-asserted in this example. Under the given conditions, the signal D_EN_INT_SCAN is asserted by the SCN_REQ logic block 39 upon the assertion of the signal VALID_MATCH in accordance with equation (2) above.

If the controller 4 asserts the signal CHAN_INT_REQ, (as indicated by the shaded block in section 73 of FIG. 3), when the scanner 23 has its CHAN_NUM<N:0> signal output set to channel M, this does not result in the INT_FLAG signal being set since at this point in time, the latch 47 has not yet been re-enabled.

Note that the assertion of the CHAN_INT_REQ occurs prior to the assertion of the signal CLK_EN_INT_SCAN during the same time cycle which is defined by the period the scanner 23 remains set to a particular channel, e.g. channel M.

As noted above, the assertion of the signal CLK_EN_INT_SCAN is required to re-enable the latch 47 via the flip-flop 99. Thus, since the CLK_EN_INT_SCAN signal is asserted only after the assertion of the CHAN_INT_REQ signal, once the signal INT_FLAG has been set, the next time the signal INT_FLAG can be set, at the earliest, is when the scanner 23 visits the channel subsequent to the channel which caused the INT_FLAG signal to be set previously.

When the signal CLK_EN_INT_SCAN is asserted by the controller 4, the signal EN_INT_SCAN is set equal to the signal D_EN_INT_SCAN as shown in section 73 of FIG. 5. The signal D_EN_INT_SCAN was asserted previously in accordance with equation (2) above when the signal INT_FLAG was not asserted and the signal VAL_MATCH was asserted. Accordingly with the assertion of the signal CLK_EN_INT_SCAN, the SCN_REQ logic block 39 re-asserts the signal EN_INT_SCAN in accordance with equation (3). This re-enables the interrupt control latch 47.

As the scanner 23 increments the signal CHAN_NUM<N:0> from channel M to M+1 the allocation process is repeated but with channel M+1 being given access to the interrupt flag this time if channel M+1 is asserting an interrupt request. The CHAN_INT_REQ signal will be asserted when the channel being visited by the scanner 23 is asserting a request for access to the interrupt flag. Thus, as illustrated in FIG. 5 section 73, with the assertion of the CHAN_INT_REQ signal by the multi-channel controller 4, while CHAN_NUM<N:0> and INT_CHAN_NUM<N:0> are both set to channel M+1, the signal SET_INT_REQ is asserted causing the INT_FLAG signal to be set.

As the signal INT_FLAG is set, the signal D_EN_INT_SCAN is de-asserted in accordance with equation (2) and the process continues as previously described. With the assertion of the CLK_EN_INT_SCAN signal by the multi-channel controller 4, the signal EN_INT_SCAN is set to equal the signal D_EN_INT_SCAN which was previously de-asserted. The de-assertion of the signal EN_INT_SCAN causes the latch 47 to close storing the signal INT_CHAN_NUM, representing channel M+1, when channel M+1 has a interrupt request asserted, as illustrated in FIG. 5 section 73. The latch 47 remains closed until the INT_FLAG signal is later cleared at some future time and the latch 47 is re-enabled in the manner described above.

In this manner, all channels will be sequenced through and can potentially be selected to interrupt before the channel which has just been granted access to the interrupt flag will get a chance to interrupt again. This insures that all channels are selected to interrupt in a fair round robin scheme.

The apparatus of the present invention, as illustrated in FIG. 2, provides an implementation efficient interrupt select mechanism that does not require the use of the N bit latch or the N input MUX required to implement the prior art interrupt select mechanism 1. Accordingly, the apparatus of the present invention requires less logic gates to implement than the prior art interrupt select mechanisms.

Furthermore, the interrupt select mechanism 25 of the present invention may be extended to support any N number of different interrupt flags. Where access to more than one interrupt flag is possible, the interrupt select mechanism 25 of the apparatus of FIG. 2, not including the scanner 23, need only be duplicated for each additional flag. The scanner 23 which is contained in the controller need not be duplicated and may be used to drive multiple interrupt select mechanisms leading to significant cost savings where multiple interrupt flags are involved.

It should be understood that the design of the present invention can be used as a round robin arbiter to share common resources among multiple requesting devices. For example, it could be used to arbitrate access to an I/O port being shared between multiple processors on a common bus or to control the sharing of common memory between multiple devices requesting access to the memory.

What is claimed is:

1. An apparatus for allocating an interrupt flag to a plurality of interrupt requesters comprising:

a plurality of interrupt requester channels;

a scanner continuously round robin scanning said plurality of interrupt requester channels;

a storage device for storing an identification of a channel requesting an interrupt, said scanner first writing an identification of said channel into said storage device and said scanner secondly locking said storage device, said scanner prevented from writing into said storage device while said storage device is locked;

means for a CPU to service an interrupt indicated by said storage device, and to clear said storage device to enable said scanner to again write into said storage device on a subsequent round robin scan of said plurality of interrupt requester channels, said means for a CPU to service an interrupt is a request flag device coupled to an interrupt flag device and a controller operates to controllably assert a flag clear signal to clear the interrupt flag output of said interrupt flag device;

a control device coupled to said storage device, said control device to lock said storage in response to a first signal from said scanner, said control device coupled to the output of said interrupt flag device and operates to unlock said storage device only when the output of said request flag device is clear;

said controller controlling said scanner, said controller coupled to said means for a CPU to service an interrupt, said controller to unlock said storage device in response to a second signal from said means for a CPU to service an interrupt;

a comparator coupled to said storage device and also coupled to said scanner, said comparator producing a match signal when there is a match between a current identification of a channel being scanned by said scanner and an identification of a channel stored in said storage device, said match signal being applied to said control device; and said control device has an AND gate having a first input coupled to said match signal of said comparator and a second negated input coupled to the output of said interrupt flag device, and an output, a flip-flop having an input coupled to the output of said AND gate and an enable input coupled to a request enable signal of said controller, said flip-flop having an output comprising the output of said control device such that said control device enables said storage device when said match signal is produced by said comparator, the output of said request flag device is clear and the request enable signal is asserted by said controller.

2. The apparatus according to claim 1 wherein said control device further comprises an OR gate having a first input coupled to said match signal of said comparator and a second input coupled to the output of said flip-flop and an output coupled to said first input of said AND gate.

* * * * *